(12) United States Patent
Liu

(10) Patent No.: US 10,986,903 B2
(45) Date of Patent: Apr. 27, 2021

(54) WALKING STICK

(71) Applicant: Shih-Chieh Liu, Changhua (TW)

(72) Inventor: Shih-Chieh Liu, Changhua (TW)

( * ) Notice: Subject to any disclaimer, the term of this patent is extended or adjusted under 35 U.S.C. 154(b) by 93 days.

(21) Appl. No.: 16/384,818

(22) Filed: Apr. 15, 2019

(65) Prior Publication Data

US 2020/0323319 A1 Oct. 15, 2020

(51) Int. Cl.
*A45B 9/00* (2006.01)
*F16B 7/10* (2006.01)
*A45B 1/04* (2006.01)

(52) U.S. Cl.
CPC .............. *A45B 9/00* (2013.01); *F16B 7/105* (2013.01); *A45B 1/04* (2013.01); *A45B 2009/007* (2013.01); *A61H 2201/0161* (2013.01)

(58) Field of Classification Search
CPC .............. A45B 2009/007; F16B 7/105; A61H 2201/0161
See application file for complete search history.

(56) References Cited

U.S. PATENT DOCUMENTS

| | | | |
|---|---|---|---|
| 8,926,214 B2 * | 1/2015 | Lah ........................... | A45B 9/00 403/109.3 |
| 10,145,141 B2 * | 12/2018 | Lovley, II ................. | E04H 15/50 |
| 2006/0254633 A1 * | 11/2006 | Willis ....................... | A45B 9/04 135/74 |
| 2010/0122718 A1 * | 5/2010 | Lah ........................... | A45B 9/00 135/75 |
| 2019/0186519 A1 * | 6/2019 | Kennedy ................... | A63C 11/221 |
| 2019/0208874 A1 * | 7/2019 | Ritter ........................ | A45B 9/04 |

FOREIGN PATENT DOCUMENTS

WO    WO-2010149883 A1 * 12/2010 ............... A45B 9/00

OTHER PUBLICATIONS

English translation of specification of WO 2010/149883 A1 from espacenet.com.*

* cited by examiner

*Primary Examiner* — David R Dunn
*Assistant Examiner* — Danielle Jackson
(74) *Attorney, Agent, or Firm* — Che-Yang Chen; Law Office of Michael Chen

(57) ABSTRACT

A walking stick may include a tube body, a first telescopic tube, a second telescopic tube, and a third telescopic tube. The tube body is a hollow tube, and at least a positioning hole is formed thereon, and a top end and a bottom end of the tube body respectively connect to a handle and a locating sleeve. The first telescopic tube upwardly inserted into the tube body comprises a first locating piece. Also, the second telescopic tube upwardly inserted into the first telescopic tube has a second locating piece while the third telescopic tube upwardly inserted into the second telescopic tube comprises a third locating piece. A user only needs to press the first locating piece when the walking stick needs to be retracted, and the second telescopic tube and the third telescopic tube are sequentially retracted, which is convenient for operation.

6 Claims, 16 Drawing Sheets

WALKING STICK

FIELD OF THE INVENTION

The present invention relates to a walking stick, and more particularly to a telescopic walking stick that is easy to operate.

BACKGROUND OF THE INVENTION

A conventional walking stick comprises a handle and a stick body which are securely connected, and the length of the walking stick is fixed and cannot be adjusted according to the needs of different users, which is not applicable and is inconvenient to carry. Therefore, there remains a need for a new and improved design for a walking stick to overcome the problems presented above.

SUMMARY OF THE INVENTION

The present invention provides a walking stick which comprises a tube body, a first telescopic tube, a second telescopic tube, and a third telescopic tube. The tube body is a hollow tube, and at least a positioning hole is formed thereon, and a top end and a bottom end of the tube body respectively connect to a handle and a locating sleeve. A first locating protrude formed on an inner wall of the locating sleeve comprises a sloped first guiding surface at a bottom portion of the first locating protrude. The first telescopic tube is upwardly inserted into the tube body, and a wall of the first telescopic tube comprises a first locating hole and a first through hole, and the first through hole is located at a position corresponding to the positioning hole of the tube body. A first tube stopper, which is coupled at a top end of the first telescopic tube, has a first connecting slot at a lateral side thereof. The first connecting slot is configured to receive a first locating piece through a first elastic member. A first positioning portion formed at a front end of the first locating piece is configured to protrude from the first through hole. A first sleeve is disposed on a bottom end of the first telescopic tube, and a second locating protrude is formed on an inner surface of the first sleeve, and a sloped second guiding surface is formed at a bottom portion of the second locating protrude. The second telescopic tube is upwardly inserted into the first telescopic tube, and a wall of the second telescopic tube comprises a second locating hole and a second through hole, and the second through hole is located at a position corresponding to the first locating hole. A second tube stopper, which is coupled at a top end of the second telescopic tube, has a second connecting slot at a lateral side thereof, and the second connecting slot is configured to receive a second locating piece through a second elastic member. A second positioning portion formed at a front end of the second locating piece is adapted to protrude from the second through hole. A second sleeve is disposed on a bottom end of the second telescopic tube. The third telescopic tube is upwardly inserted into the second telescopic tube, and a wall of the third telescopic tube comprises a third through hole which is located at a position corresponding to the second locating hole. A third tube stopper, which is coupled at a top end of the third telescopic tube, has a third connecting slot at a lateral side thereof, and the third connecting slot is configured to receive a third locating piece through a third elastic member. A third positioning portion formed at a front end of the third locating piece is adapted to protrude from the third through hole, and a supporting base is disposed on a bottom end of the third telescopic tube.

In one embodiment, the first locating piece, the second locating piece, and the third locating piece respectively comprise a first locating portion, a second locating portion, and a third locating portion, and the first locating portion, the second locating portion, and the third locating portion respectively have outer diameters larger than the first positioning portion, the second positioning portion, and the third positioning portion.

In another embodiment, each of the first connecting slot, the second connecting slot, and the third connecting slot is a square slot, and each of the first locating portion of the first locating piece, the second locating portion of the second locating piece, and the third locating portion of the third locating piece is formed in a square column shape respectively corresponding to the first connecting slot, the second connecting slot, and the third connecting slot, such that the first locating portion, the second locating portion, and the third locating portion are respectively limited in the first connecting slot, the second connecting slot, and the third connecting slot without been rotated.

In still another embodiment, a top surface and a bottom surface of the second positioning portion are respectively formed into a first arc surface and a first plane while a top surface and a bottom surface of the third positioning portion are respectively formed into a second arc surface and a second plane.

In a further embodiment, the first telescopic tube, the second telescopic tube, and the third telescopic tube respectively have a first bolt hole, a second bolt hole, and a third bolt hole, and the first tube stopper, the second tube stopper, and the third tube stopper respectively have a first locating slot, a second locating slot, and a third locating slot located at positions corresponding to the first bolt hole, the second bolt hole, and the third bolt hole; a first bolt, a second bolt, and a third bolt are configured to be respectively inserted through the first bolt hole, the second bolt hole, the third bolt hole into the first locating slot, the second locating slot, and the third locating slot, thereby positioning the first tube stopper, the second tube stopper, and the third tube stopper.

In still a further embodiment, the handle comprises a tube plug, and the handle is connected at the top end of the tube body through the tube plug.

In a particular embodiment, a hook rib is formed at a lateral portion of the tube plug.

Comparing with conventional walking sticks, the present invention is advantageous because: (i) with the first locating piece, the second locating piece, the third locating piece, the locating sleeve, the first sleeve, the first locating protrude, and the second locating protrude, a user only needs to press the first locating piece when the walking stick needs to be retracted, and the second telescopic tube and the third telescopic tube are sequentially retracted, which is convenient for operation; (ii) after retraction, the first locating protrude and the second locating protrude are respectively engaged with the first locating hole of the first telescopic tube and the second locating hole of the second telescopic tube, which prevents the connections from been loose; and (iii) with the first locating piece, the second locating piece, and the third locating piece, the first telescopic tube, the second telescopic tube, and the third telescopic tube can be quickly pulled out, which is convenient for use.

DETAILED DESCRIPTION OF THE INVENTION

The detailed description set forth below is intended as a description of the presently exemplary device provided in accordance with aspects of the present invention and is not intended to represent the only forms in which the present invention may be prepared or utilized. It is to be understood, rather, that the same or equivalent functions and components may be accomplished by different embodiments that are also intended to be encompassed within the spirit and scope of the invention.

Unless defined otherwise, all technical and scientific terms used herein have the same meaning as commonly understood to one of ordinary skill in the art to which this invention belongs. Although any methods, devices and materials similar or equivalent to those described can be used in the practice or testing of the invention, the exemplary methods, devices and materials are now described.

All publications mentioned are incorporated by reference for the purpose of describing and disclosing, for example, the designs and methodologies that are described in the publications that might be used in connection with the presently described invention. The publications listed or discussed above, below and throughout the text are provided solely for their disclosure prior to the filing date of the present application. Nothing herein is to be construed as an admission that the inventors are not entitled to antedate such disclosure by virtue of prior invention.

Figure 1:
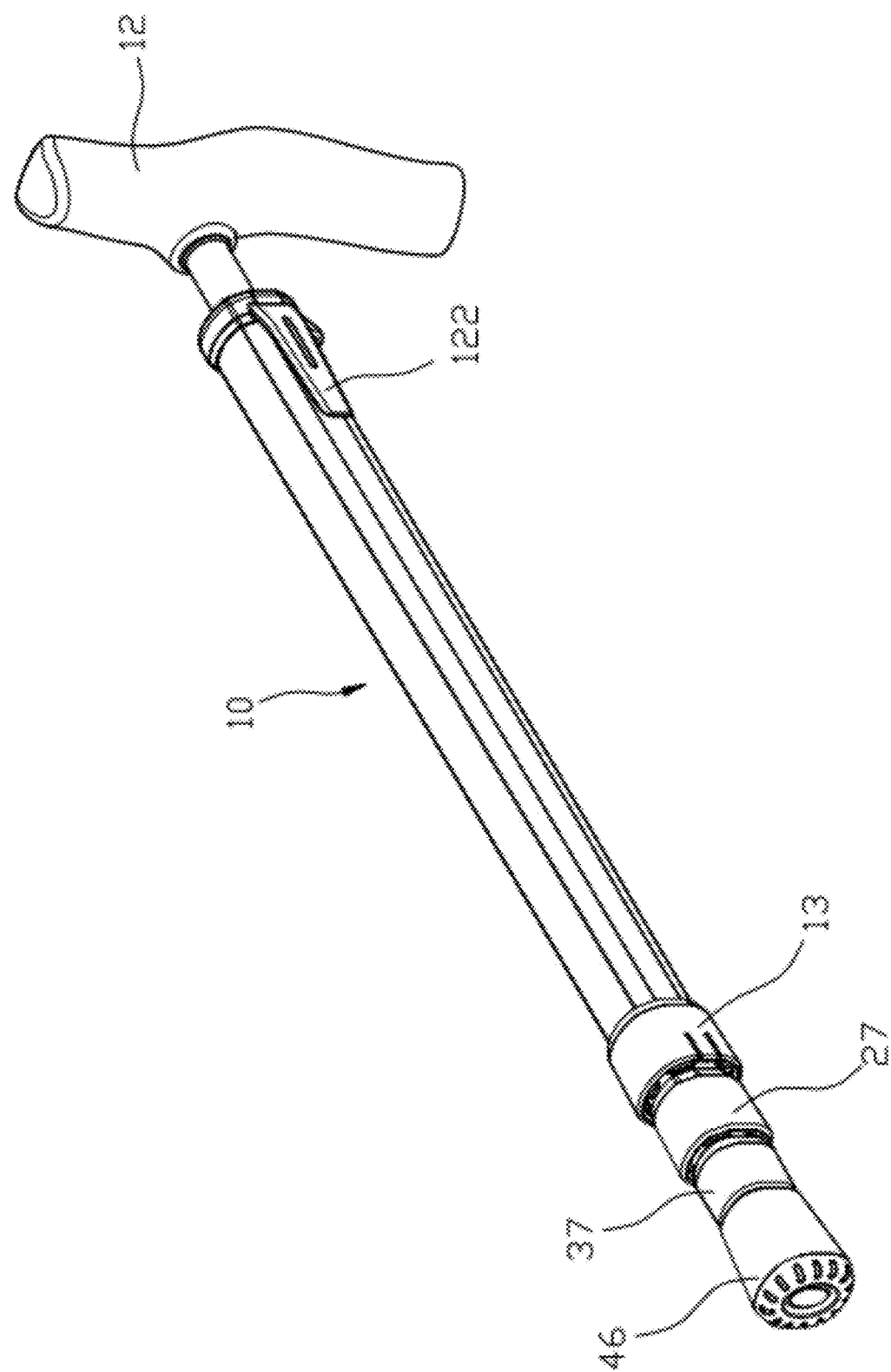
FIG. 1 is a three-dimensional view of a walking stick of the present invention.
Figure 2:
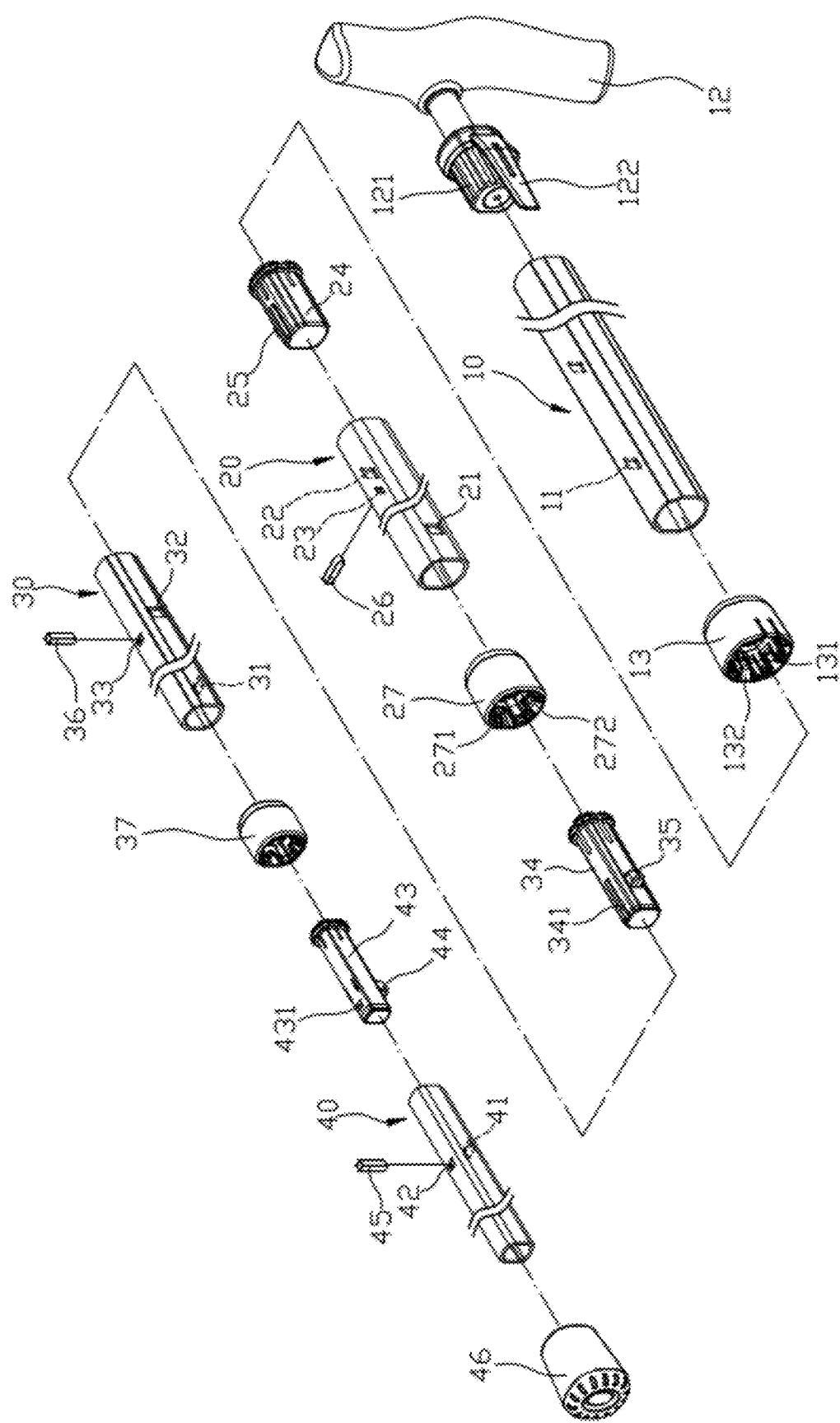
FIG. 2 is an exploded view of the walking stick of the present invention.
Figure 3:
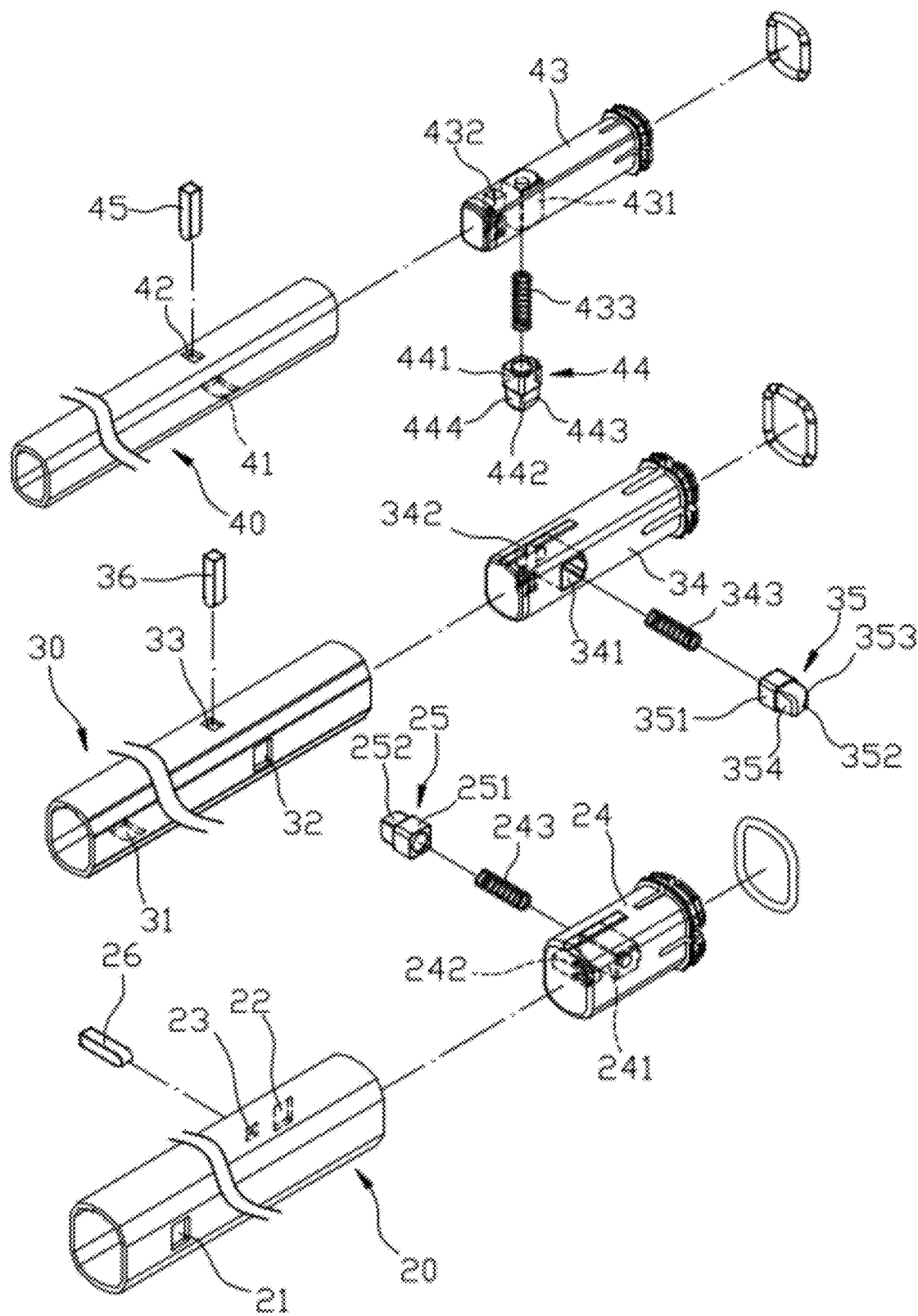
FIG. 3 is another exploded view of the walking stick of the present invention.
Figure 4:
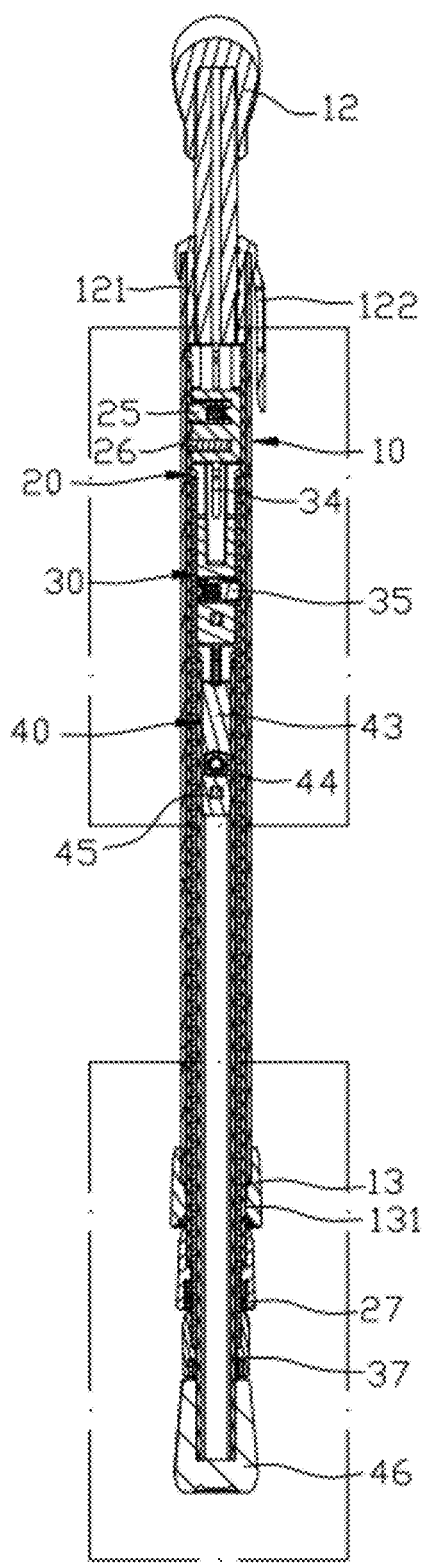
FIG. 4 is a sectional assembly view of the walking stick of the present invention.
Figure 5:
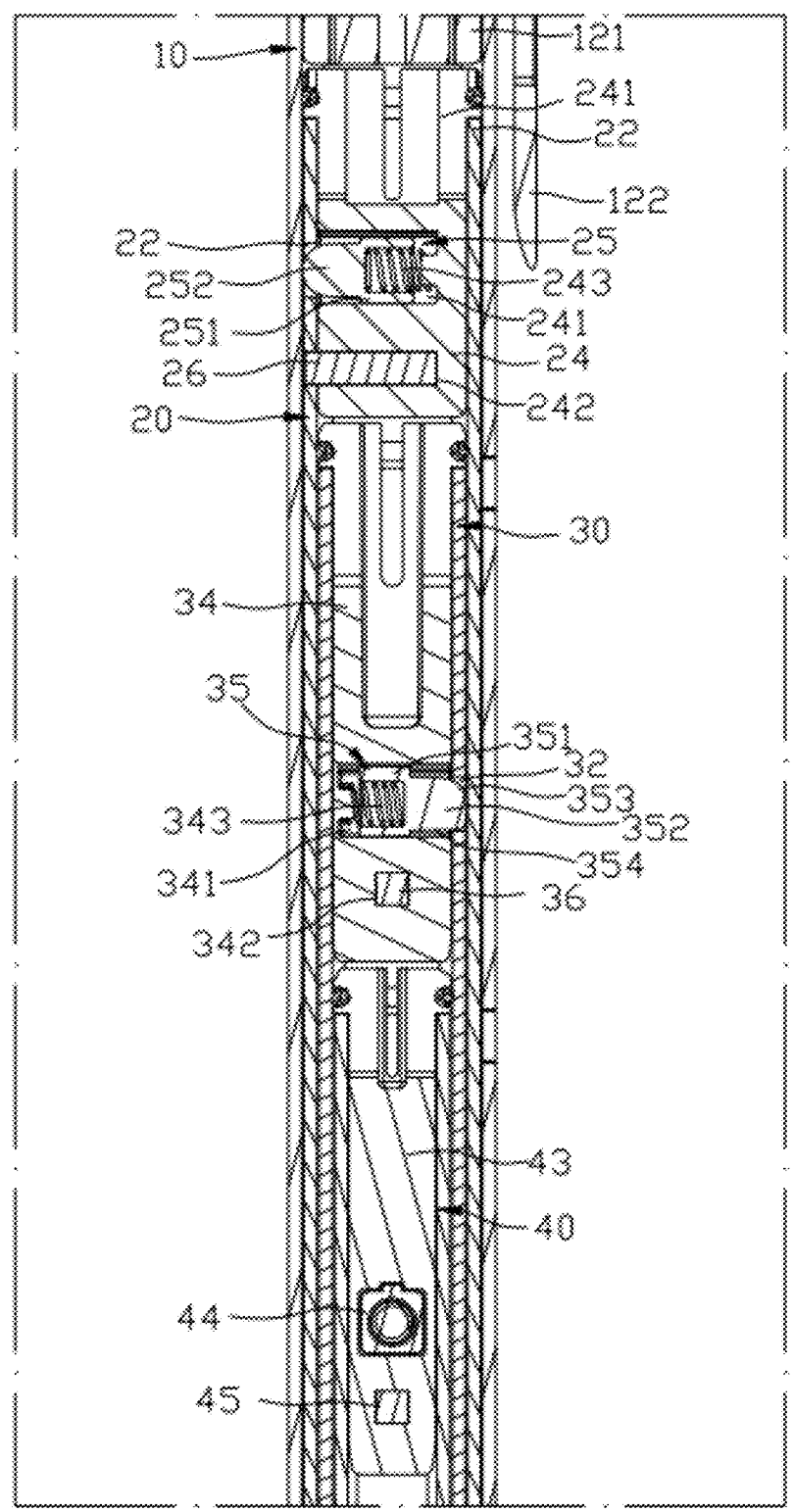
FIG. 5 is a first partially enlarged view of FIG. 4.

In order to further understand the goal, characteristics and effect of the present invention, a number of embodiments along with the drawings are illustrated as following:

Referring to FIGS. 1 to 3, the present invention provides a walking stick which comprises a tube body (10), a first telescopic tube (20), a second telescopic tube (30), and a third telescopic tube (40). The tube body (10) is a hollow tube and at least a positioning hole (11) is formed thereon, and a handle (12) having a tube plug (121) is connected at a top end of the tube body (10). Moreover, a hook rib (122) is formed at a lateral portion of the tube plug (121). A locating sleeve (13) is disposed at a bottom end of the tube body (10), and a first locating protrude (131) formed on an inner wall of the locating sleeve (13) comprises a sloped first guiding surface (132) at a bottom portion of the first locating protrude (131). The first telescopic tube (20) is upwardly inserted into the tube body (10), and a wall of the first telescopic tube (20) comprises a first locating hole (21), a first through hole (22), and a first bolt hole (23), and the first through hole (22) is located at a position corresponding to the positioning hole (11) of the tube body (10). A first tube stopper (24), which is coupled at a top end of the first telescopic tube (20), has a first connecting slot (241) and a first locating slot (242) at a lateral side thereof. Moreover, the first connecting slot (241) is a square slot and is configured to receive a first locating piece (25) through a first elastic member (243). Furthermore, the first locating piece (25) comprises a first locating portion (251), and a first positioning portion (252) is formed at a front end of the first locating portion (251). Each of the first locating portion (251) and the first positioning portion (252) is formed in a square column shape, and an outer diameter of the first locating portion (251) is larger than an outer diameter of the first positioning portion (252), and the first locating portion (251) is limited in the first connecting slot (241) without been rotated. Also, the first positioning portion (252) of the first locating piece (25) protrudes from the first through hole (22), and a first bolt (26) is inserted through the first bolt hole (23) into the first locating slot (242) so as to connect the first tube stopper (24) to the first telescopic tube (20). In addition, a first sleeve (27) is disposed on a bottom end of the first telescopic tube (20), and a second locating protrude (271) is formed on an inner surface of the first sleeve (27), and a sloped second guiding surface (272) is formed at a bottom portion of the second locating protrude (271).

The second telescopic tube (30) is upwardly inserted into the first telescopic tube (20), and a wall of the second telescopic tube (30) comprises a second locating hole (31), a second through hole (32), and a second bolt hole (33), and the second through hole (32) is located at a position corresponding to the first locating hole (21). A second tube stopper (34), which is coupled at a top end of the second telescopic tube (30), has a second connecting slot (341) and a second locating slot (342) at a lateral side thereof. Moreover, the second connecting slot (341) is a square slot and is configured to receive a second locating piece (35) through a second elastic member (343). Furthermore, the second locating piece (35) comprises a second locating portion (351), and a second positioning portion (352) is formed at a front end of the second locating portion (351). An outer diameter of the second locating portion (351) is larger than an outer diameter of the second positioning portion (352), and the second locating portion (351) is formed into a square column shape corresponding to the second connecting slot (341) such that the second locating portion (351) is limited in the second connecting slot (341) without been rotated. Also, a top surface and a bottom surface of the second positioning portion (352) are respectively formed into a first arc surface (353) and a first plane (354). The second positioning portion (352) of the second locating piece (35) protrudes from the second through hole (32), and a second bolt (36) is inserted through the second bolt hole (33) into the second locating slot (342) so as to connect the second tube stopper (34) to the second telescopic tube (30). Additionally, a second sleeve (37) is disposed on a bottom end of the second telescopic tube (30).

The third telescopic tube (40) is upwardly inserted into the second telescopic tube (30), and a wall of the third telescopic tube (40) comprises a third through hole (41) and a third bolt hole (42), and the third through hole (41) is located at a position corresponding to the second locating hole (31). A third tube stopper (43), which is coupled at a top end of the third telescopic tube (40), has a third connecting slot (431) and a third locating slot (432) at a lateral side thereof. Moreover, the third connecting slot (431) is a square slot and is configured to receive a third locating piece (44) through a third elastic member (433). Furthermore, the third locating piece (44) comprises a third locating portion (441), and a third positioning portion (442) is formed at a front end of the third locating portion (441). An outer diameter of the third locating portion (441) is larger than an outer diameter of the third positioning portion (442), and the third locating portion (441) is formed into a square column shape corresponding to the third connecting slot (431) such that the third locating portion (441) is limited in the third connecting slot (431) without been rotated. Also, a top surface and a bottom surface of the third positioning portion (442) are respectively formed into a second arc surface (443) and a second plane (444). The third positioning portion (442) of the third locating piece (44) protrudes from the third through hole (41), and a third bolt (45) is inserted through the third bolt hole (42) into the third locating slot (432) so as to connect the third tube stopper (43) to the third telescopic tube (40). Additionally, a supporting base (46) is disposed on a bottom end of the third telescopic tube (40).

Structurally, referring to FIGS. 2 to 8, the tube body (10), the first telescopic tube (20), the second telescopic tube (30), and the third telescopic tube (40) are connected together in sequence. The third tube stopper (43) is disposed on the top end of the third telescopic tube (40), and the third locating piece (44) is configured to protrude from the third through hole (41), and the third bolt (45) is inserted into the third bolt hole (42) so as to secure the third tube stopper (43) at the top end of the third telescopic tube (40). Thereafter, the third telescopic tube (40) is adapted to be inserted into the second telescopic tube (30), and the third locating piece (44) is borne against by an inner wall of the second telescopic tube (33) to move in the third through hole (41). Moreover, the bottom end of the third telescopic tube (40) is adapted to protrude from the bottom end of the second telescopic tube (30), and the second tube stopper (34) is disposed on the top end of the second telescopic tube (30). Additionally, the second locating piece (35) is configured to protrude from the second through hole (32), and the second bolt (36) is inserted into the second bolt hole (33) so as to secure the second tube stopper (34) at the top end of the second telescopic tube (30). The second telescopic tube (30) is connected with the third telescopic tube (40), and the second telescopic tube (30) is configured to be upwardly inserted into the first telescopic tube (20), and the second locating piece (35) is adapted to be borne against by an inner wall of the first telescopic tube (20) move in the second through hole (32). Moreover, the bottom end of the second telescopic tube (30) is adapted to protrude from the bottom end of the first telescopic tube (20), and the first tube stopper (24) is disposed on the top end of the first telescopic tube (20). The first telescopic tube (20) is connected to the second telescopic tube (30) with the third telescopic tube (40), and the first telescopic tube (20) is adapted to be upwardly inserted into the tube body (10), and the first locating piece (25) is borne against by an inner wall of the tube body (10) so as to move into the first through hole (22). Furthermore, the bottom end of the first telescopic tube (20) is adapted to protrude from the bottom end of the tube body (10). Thus, the tube body (10), the first telescopic tube (20), the second telescopic tube (30), and the third telescopic tube (40) are slidably connected in sequence. Also, the locating sleeve (13) is disposed on the bottom end of the tube body (10) while the first sleeve (27) is disposed on the bottom end of the first telescopic tube (20), and the second sleeve (37) is disposed on the bottom end of the second telescopic tube (30) while the supporting base (46) is disposed on the bottom end of the third telescopic tube (40). The locating sleeve (13), the first sleeve (27), the second sleeve (37), and the supporting base (46) are configured to limit the positions of the first telescopic tube (20), the second telescopic tube (30), and the third telescopic tube (40), and prevent the first telescopic tube (20), the second telescopic tube (30), the third telescopic tube (40) from falling into the tube body (10), the first telescopic tube (20), and the second telescopic tube (30) respectively. At last, the handle (12) is installed on the top end of the tube body (10) through tube plug (121), thereby completing the assembly process of the walking stick.

In actual application, referring to FIGS. 9 to 13, when a user pulls the third telescopic tube (40) out, the third telescopic tube (40) can be easily pulled out since it is not limited. Also, in the process of pulling out, the third positioning portion (442) of the third locating piece (44) is adapted to protrude out from and engage with the second locating hole (31) of the second telescopic tube (30), thereby achieving the effect of positioning. Moreover, the second plane (444) formed at the bottom surface of the third locating piece (44) is adapted to firmly bear against an edge of the second locating hole (31) of the second telescopic tube (30) so as to limit the length of pulling out of the third telescopic tube (40) from the second telescopic tube (30) and to build the connection between the second telescopic tube (30) and the third telescopic tube (40). Thus, when the user keeps pulling the third telescopic tube (40), the second telescopic tube (30) is adapted to be driven and pulled out from the first telescopic tube (20), and the second positioning portion (352) of the second locating piece (35) is configured to protrude from the second through hole (32) and to engage with the first locating hole (21) of the first telescopic tube (20) so as to achieve the effect of positioning. In addition, the first plane (354) formed at the bottom surface of the second locating piece (35) is adapted to firmly bear against an edge of the first locating hole (21) of the first telescopic tube (20) so as to limit the length of pulling out of the second telescopic tube (30) from the first telescopic tube (20) and to build the connection between the first telescopic tube (20) and the second telescopic tube (30). Thus, when the user keeps pulling the second telescopic tube (30), the first telescopic tube (20) is adapted to be driven and pulled out from the tube body (10), and the first locating portion (251) of the first locating piece (25) is adapted to protrude from the first through hole (22) and to engage with the positioning hole (11) of the tube body (10) so as to achieve the effect of positioning. Moreover, the first positioning portion (252) of the first locating piece (25) is formed in a square column shape which is adapted to couple with four sides of the positioning hole (11) of the tube body (10), as to limit the length of pulling out of the first telescopic tube (20) from the tube body (10) and also to prevent the first telescopic tube (20) from sliding into the tube body (10) when the tube body (10) is pressed to squeeze the first locating piece (25), thereby highly improving the safety in use.

Figure 6:
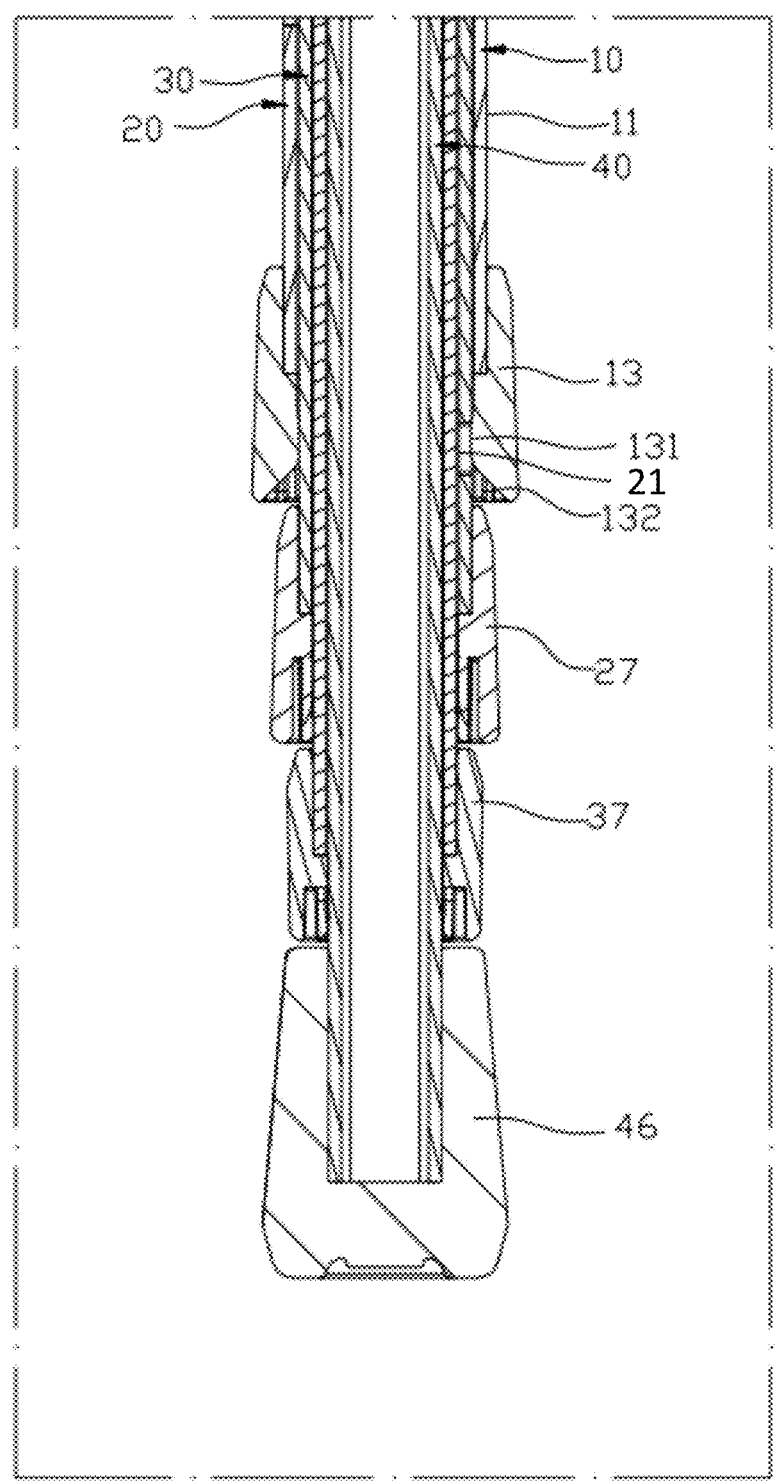
FIG. 6 is a second partially enlarged view of FIG. 4.
Figure 7:
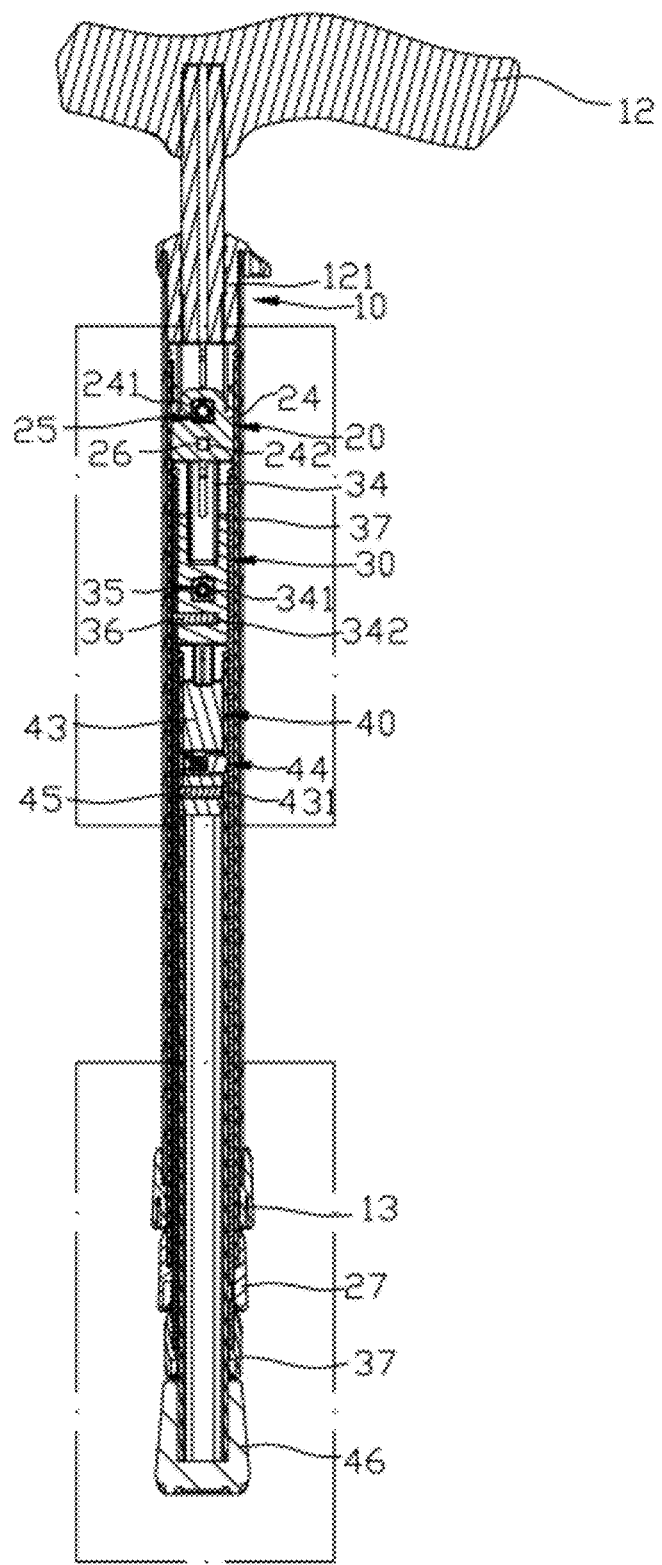
FIG. 7 is a sectional assembly view from another angle of the walking stick of the present invention.
Figure 8:
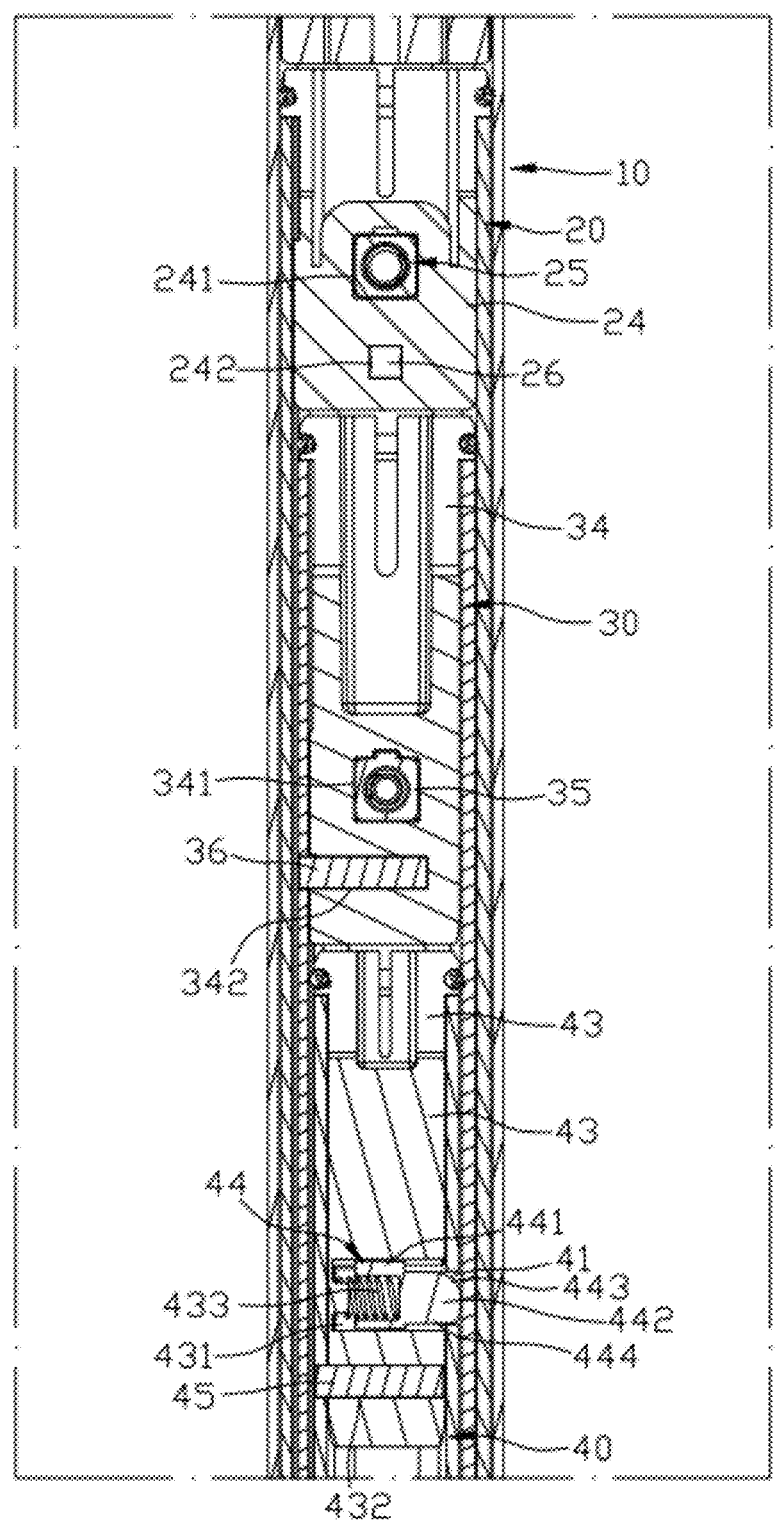
FIG. 8 is a first partially enlarged view of FIG. 7.
Figure 9:
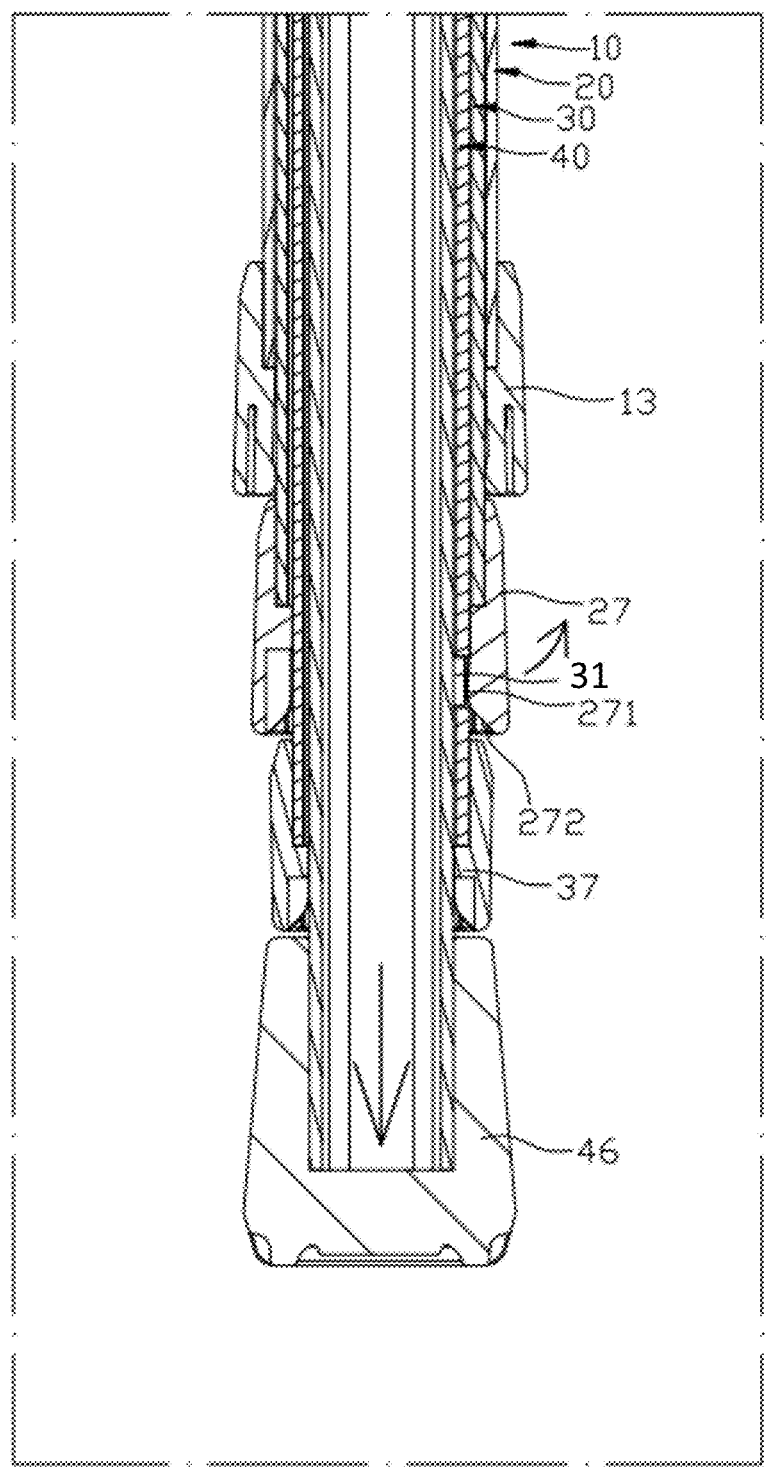
FIG. 9 is a second partially enlarged view of FIG. 7.
Figure 10:
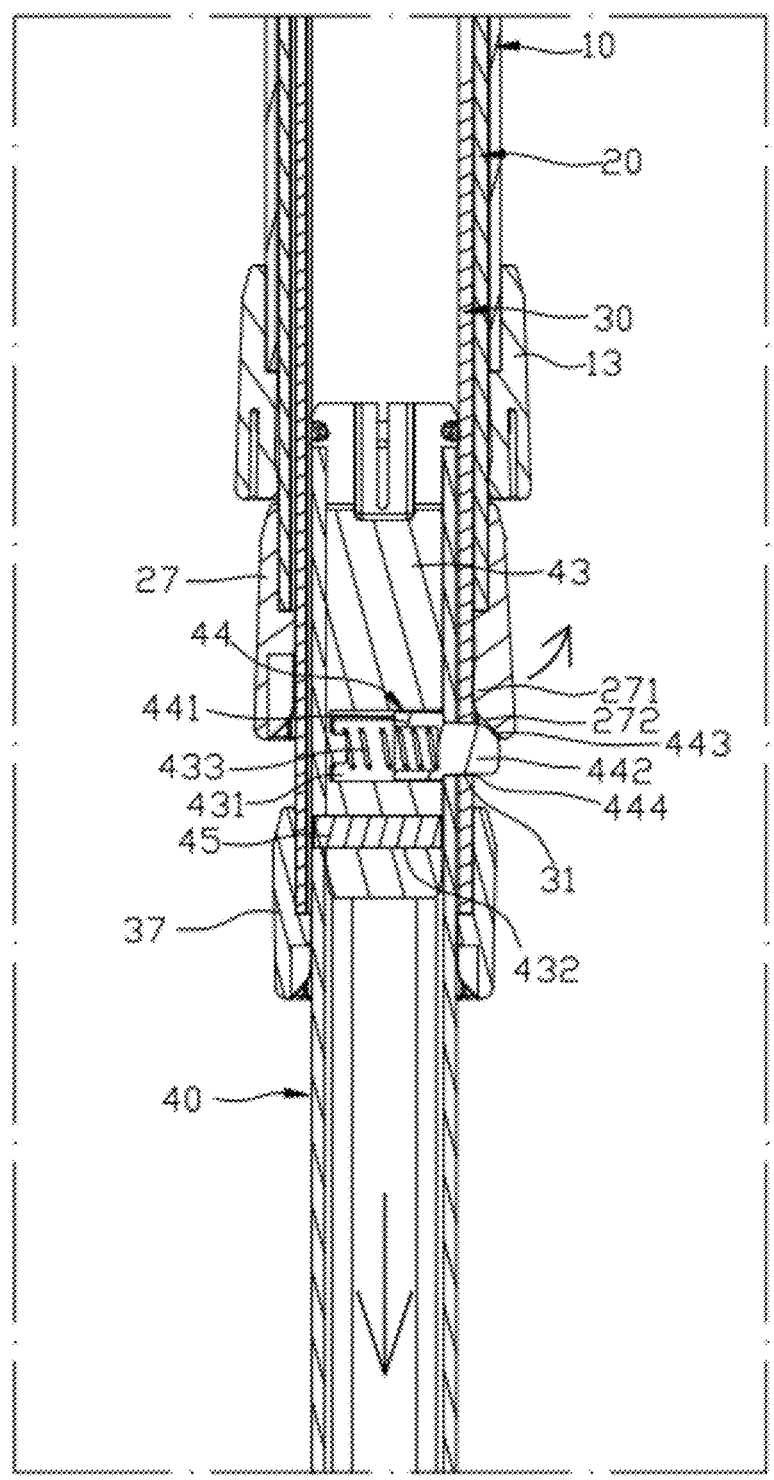
FIG. 10 is a schematic view illustrating the walking stick of the present invention is stretched.
Figure 11:
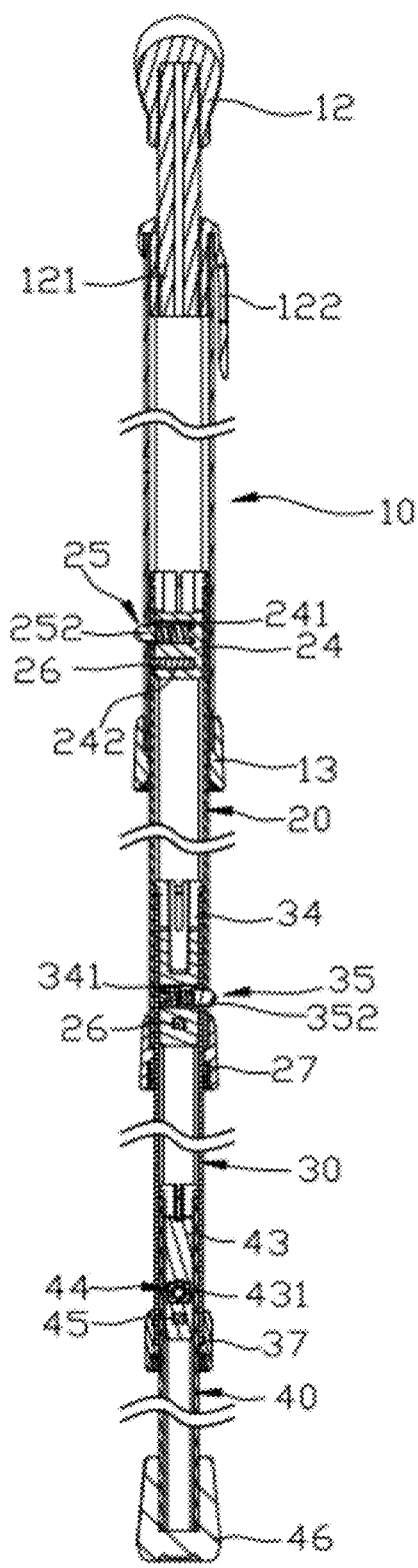
FIG. 11 is a sectional view illustrating the walking stick of the present invention is stretched.
Figure 12:
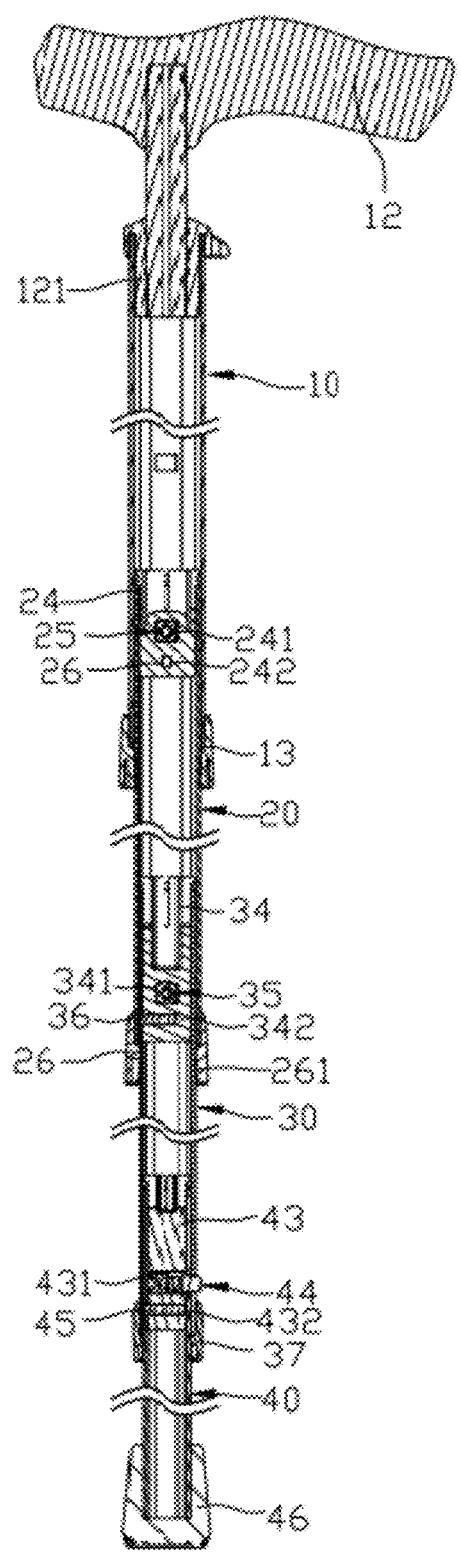
FIG. 12 is a sectional view from another angle illustrating the walking stick of the present invention is stretched.
Figure 13:
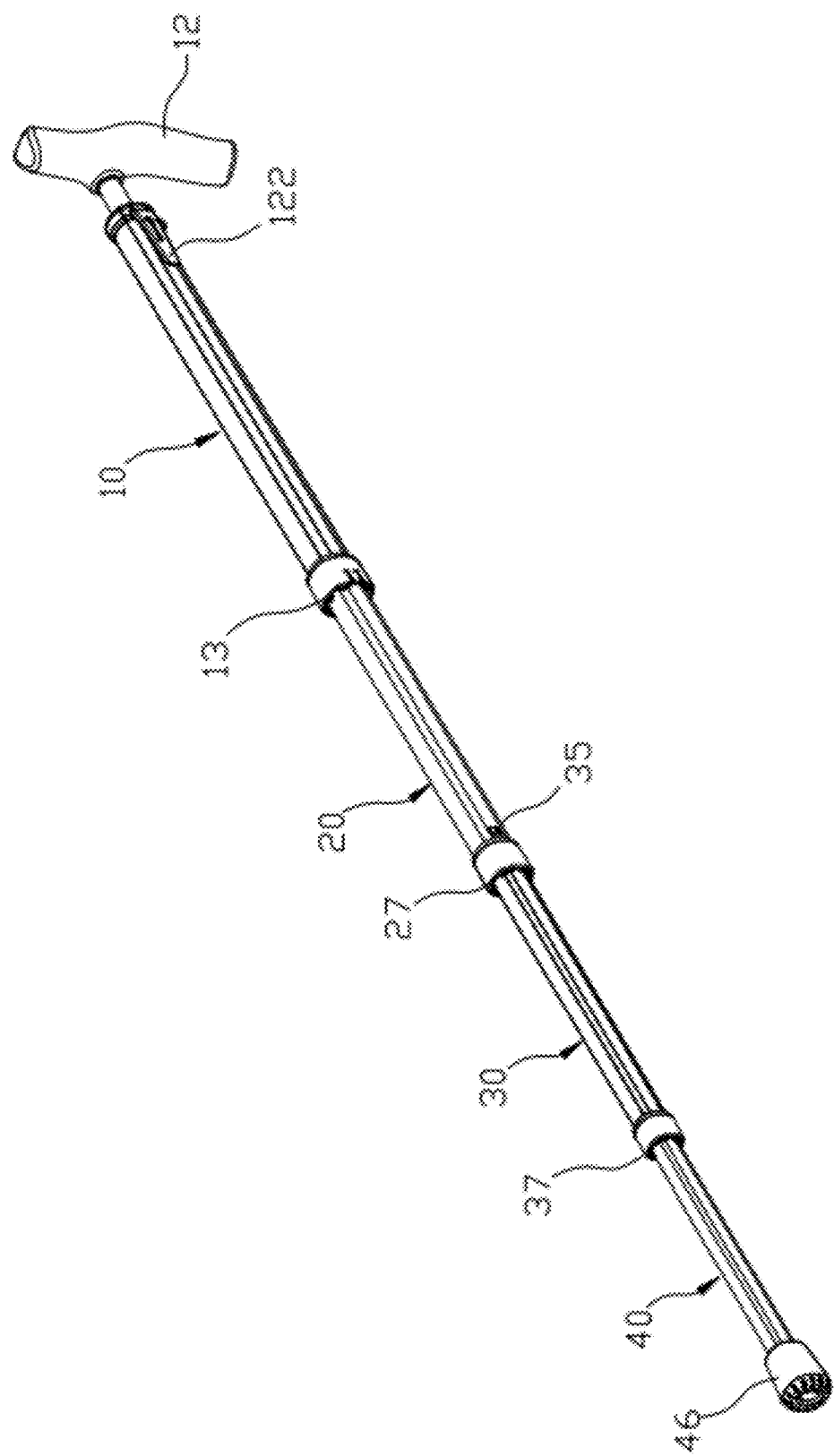
FIG. 13 is a three-dimensional view illustrating the walking stick of the present invention is stretched.
Figure 14:
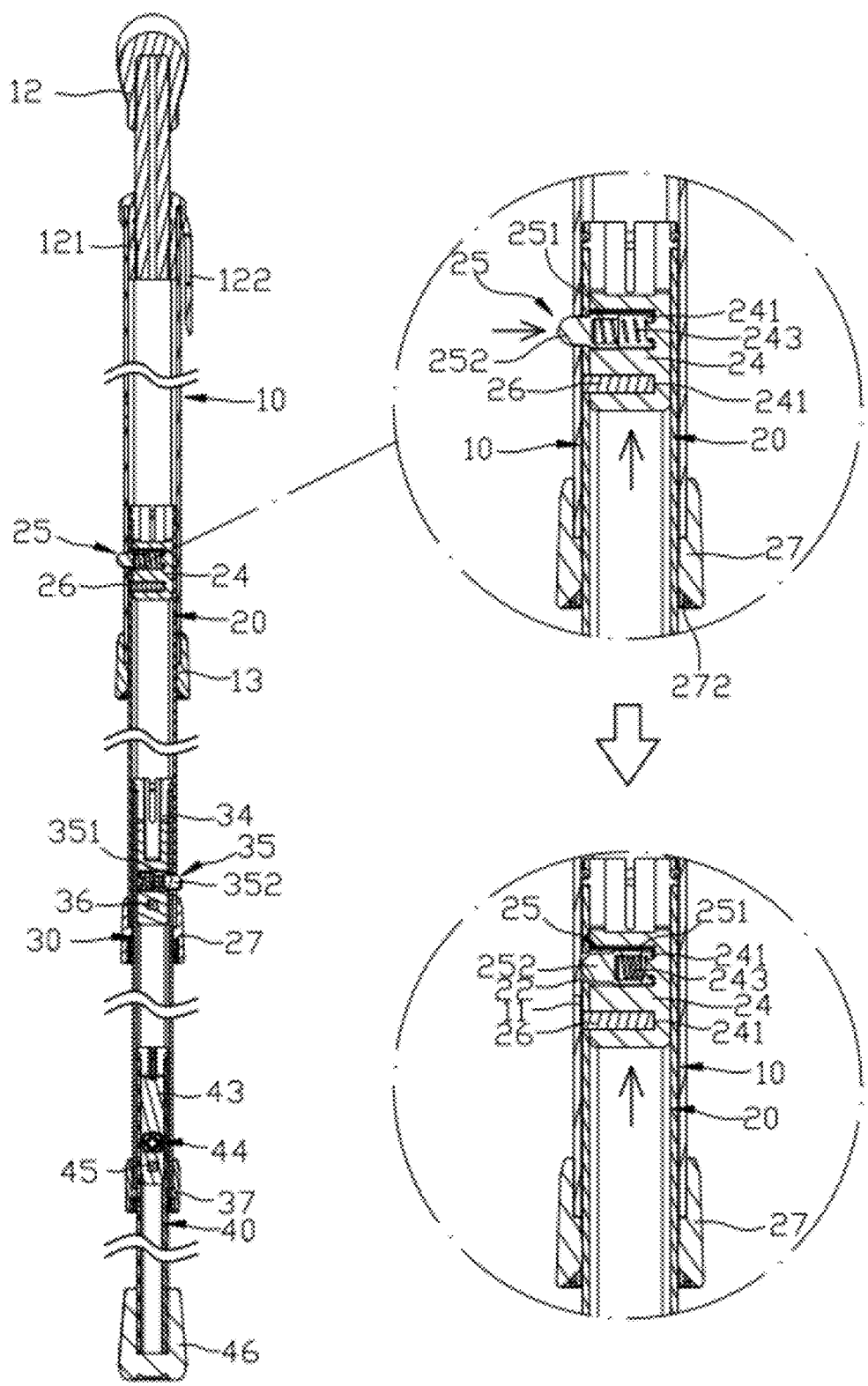
FIG. 14 is a first partially enlarged schematic view illustrating the walking stick of the present invention is retracted.
Figure 15:
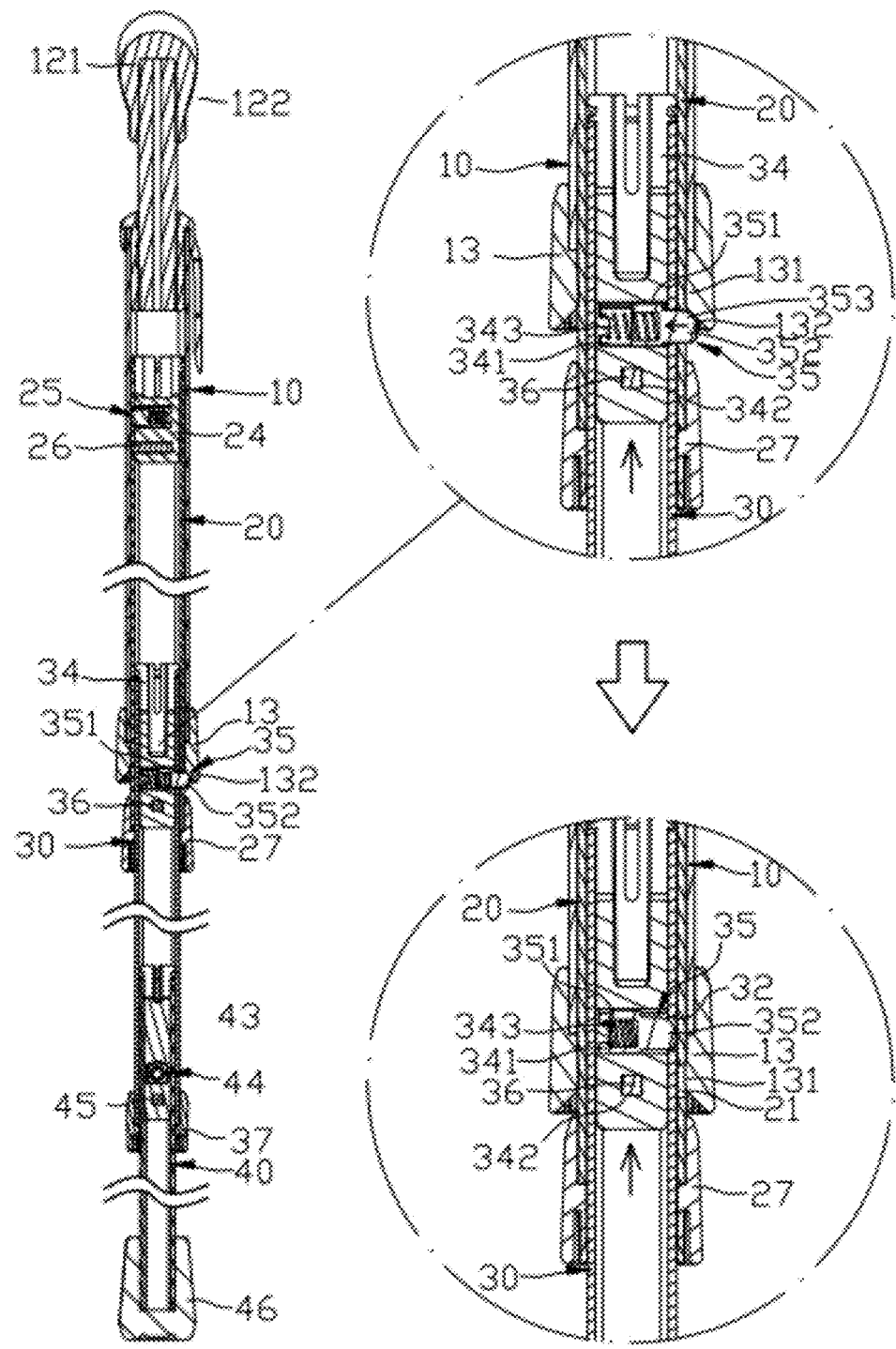
FIG. 15 is a second partially enlarged schematic view illustrating the walking stick of the present invention is retracted.
Figure 16:
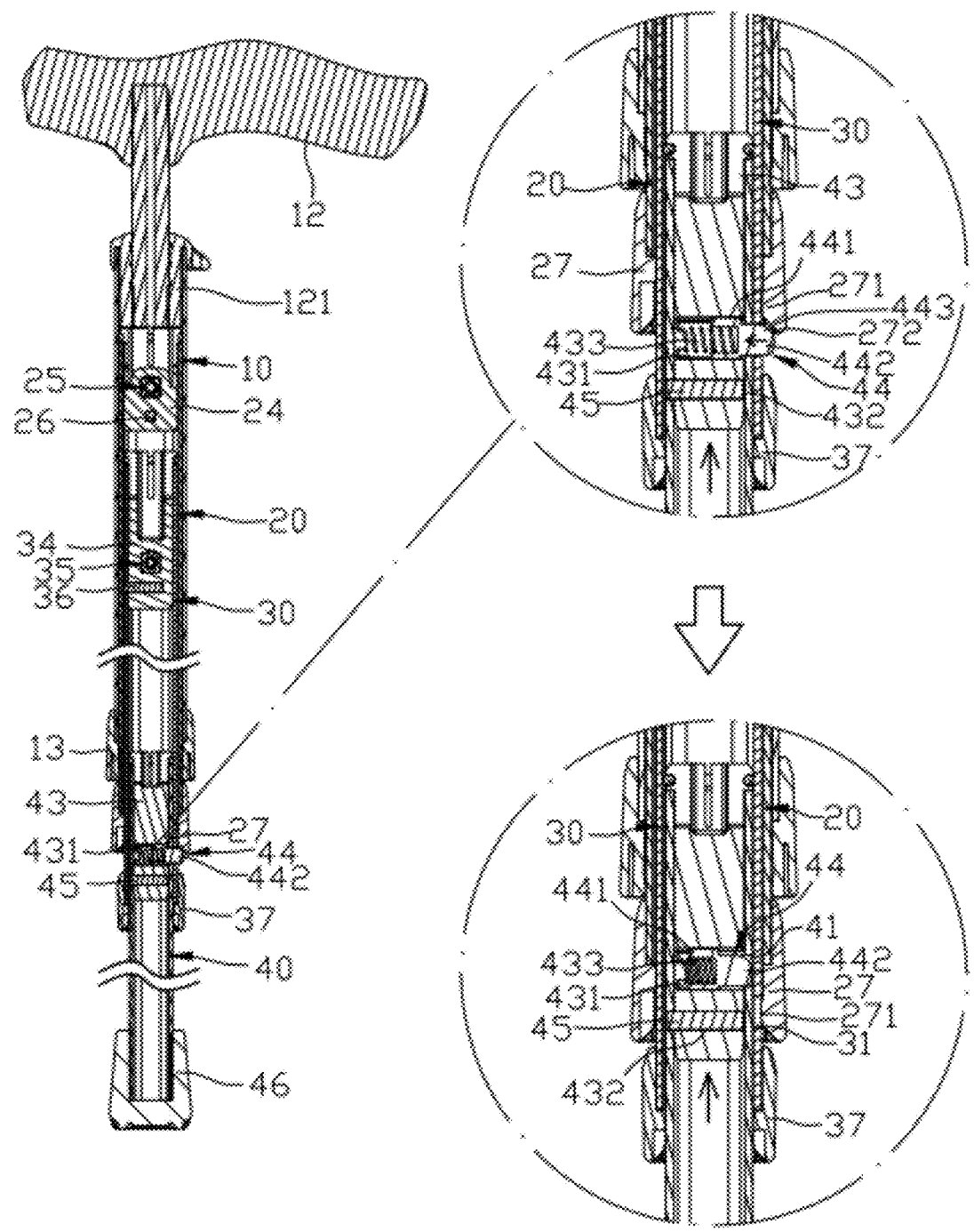
FIG. 16 is a third partially enlarged schematic view illustrating the walking stick of the present invention is retracted.

On the contrary, when the walking stick needs to be retracted back into its original position, referring to FIGS. 14 to 16, a user can upwardly push the third telescopic tube (40) or can bear the third telescopic tube (40) again the floor to retract the walking stick into the tube body (10). Firstly, the user can press the first locating piece (25) into the positioning hole (11) and the first through hole (22) chronologically, so that the connection between the first telescopic tube (20) and the tube body (10) is detached and the first telescopic tube (20) can be slid into the tube body (10). Meanwhile, the second telescopic tube (30) is also slid toward the tube body (10), and the second locating piece (35) protruding from the first locating hole (21) is moved closer to the locating sleeve (13). Furthermore, the first arc surface (353) of the second positioning portion (352) is borne against by the first guiding surface (132) of the locating sleeve (13) and the first locating protrude (131), and the second locating piece (35) is adapted to be squeezed into the first locating hole (21) and the second through hole (32) chronologically, so that the connection between the second telescopic tube (30) and the first telescopic tube (20) is detached and the second telescopic tube (30) can be slid into the first telescopic tube (20). Also, the first locating protrude (131) is engaged into the first locating hole (21) to achieve the positioning effect (as shown in FIG. 6). When the second telescopic tube (30) is slid into the first telescopic tube (20), the third telescopic tube (40) is driven and also slid toward the first telescopic tube (20). The third locating piece (44) protruding from the second locating hole (31) is moved closer to the first sleeve (27) and is borne against by the second guiding surface (272) of the first sleeve (27) and the second locating protrude (271), and the third locating piece (44) is configured to be squeezed into the second locating hole (31) and the third through hole (41) chronologically, so that the connection between the third telescopic tube (40) and the second telescopic tube (30) is detected and the third telescopic tube (40) can be slid into the second telescopic tube (30). In addition, the second locating protrude (271) is engaged into the second locating hole (31) to achieve the positioning effect (as shown in FIG. 9), thereby completing the retraction of the walking stick.

Comparing with conventional walking sticks, the present invention is advantageous because: (i) with the first locating piece (25), the second locating piece (35), the third locating piece (44), the locating sleeve (13), the first sleeve (27), the first locating protrude (131), and the second locating protrude (271), a user only needs to press the first locating piece (25) when the walking stick needs to be retracted, and the second telescopic tube (30) and the third telescopic tube (40) are sequentially retracted, which is convenient for operation; (ii) after retraction, the first locating protrude (131) and the second locating protrude (271) are respectively engaged with the first locating hole (21) of the first telescopic tube (20) and the second locating hole (31) of the second telescopic tube (30), which prevents the connections from being loose; and (iii) with the first locating piece (25), the second locating piece (35), and the third locating piece (44), the first telescopic tube (20), the second telescopic tube (30), and the third telescopic tube (40) can be quickly pulled out, which is convenient for use.

Having described the invention by the description and illustrations above, it should be understood that these are exemplary of the invention and are not to be considered as limiting. Accordingly, the invention is not to be considered as limited by the foregoing description, but includes any equivalents.

What is claimed is:

1. A walking stick comprising a tube body, a first telescopic tube, a second telescopic tube, and a third telescopic tube,
   wherein the tube body is a hollow tube, and at least a positioning hole is formed thereon, and a top end and a bottom end of the tube body respectively connect to a handle and a locating sleeve; a first locating protrude formed on an inner wall of the locating sleeve comprises a sloped first guiding surface at a bottom portion of the first locating protrude;
   wherein the first telescopic tube is upwardly inserted into the tube body, and a wall of the first telescopic tube comprises a first locating hole, and a separate wall comprises a first through hole, and the first through hole is located at a position corresponding to the positioning hole of the tube body; a first tube stopper, which is coupled at a top end of the first telescopic tube, has a first connecting slot at a lateral side thereof, and the first connecting slot is configured to receive a first locating piece through a first elastic member; a first positioning portion formed at a front end of the first locating piece is configured to protrude from the first through hole; a first sleeve is disposed on a bottom end of the first telescopic tube, and a second locating protrude is formed on an inner surface of the first sleeve, and a sloped second guiding surface is formed at a bottom portion of the second locating protrude;
   wherein the second telescopic tube is upwardly inserted into the first telescopic tube, and a wall of the second telescopic tube comprises a second locating hole, and a separate wall comprises a second through hole, and the second through hole is located at a position corresponding to the first locating hole; a second tube stopper, which is coupled at a top end of the second telescopic tube, has a second connecting slot at a lateral side thereof, and the second connecting slot is configured to receive a second locating piece through a second elastic member; a second positioning portion formed at a front end of the second locating piece is adapted to protrude from the second through hole; a second sleeve is disposed on a bottom end of the second telescopic tube; and
   wherein the third telescopic tube is upwardly inserted into the second telescopic tube, and a wall of the third telescopic tube comprises a third through hole which is located at a position corresponding to the second locating hole; a third tube stopper, which is coupled at a top end of the third telescopic tube, has a third connecting slot at a lateral side thereof, and the third connecting slot is configured to receive a third locating piece through a third elastic member; a third positioning portion formed at a front end of the third locating piece is adapted to protrude from the third through hole, and a supporting base is disposed on a bottom end of the third telescopic tube,
   wherein the first telescopic tube, the second telescopic tube, and the third telescopic tube respectively have a first bolt hole, a second bolt hole, and a third bolt hole, and the first tube stopper, the second tube stopper, and the third tube stopper respectively have a first locating slot, a second locating slot, and a third locating slot located at positions corresponding to the first bolt hole, the second bolt hole, and the third bolt hole; a first bolt, a second bolt, and a third bolt are configured to be respectively inserted through the first bolt hole, the second bolt hole, the third bolt hole, into the first locating slot, the second locating slot, and the third locating slot respectively, thereby positioning the first tube stopper, the second tube stopper, and the third tube stopper.

2. The walking stick of claim 1, wherein the first locating piece, the second locating piece, and the third locating piece respectively comprise a first locating portion, a second locating portion, and a third locating portion, and each of the first locating portion, the second locating portion, and the third locating portion respectively has an outer diameter larger than the first positioning portion, the second positioning portion, and the third positioning portion respectively.

3. The walking stick of claim 1, wherein each of the first connecting slot, the second connecting slot, and the third connecting slot is a square slot, and each of a first locating portion of the first locating piece, a second locating portion of the second locating piece, and a third locating portion of the third locating piece is formed in a square column shape respectively corresponding to the first connecting slot, the second connecting slot, and the third connecting slot, such that the first locating portion, the second locating portion, and the third locating portion are respectively limited in the first connecting slot, the second connecting slot, and the third connecting slot without being rotated.

4. The walking stick of claim 1, wherein a top surface and a bottom surface of the second positioning portion are respectively formed into a first arc surface and a first plane, and a top surface and a bottom surface of the third positioning portion are respectively formed into a second arc surface and a second plane.

5. The walking stick of claim 1, wherein the handle comprises a tube plug, and the handle is connected at the top end of the tube body through the tube plug.

6. The walking stick of claim 5, wherein a hook rib is formed at a lateral portion of the tube plug.

* * * * *